(12) United States Patent
Stewart et al.

(10) Patent No.: US 6,571,221 B1
(45) Date of Patent: May 27, 2003

(54) NETWORK COMMUNICATION SERVICE WITH AN IMPROVED SUBSCRIBER MODEL USING DIGITAL CERTIFICATES

(75) Inventors: Brett B. Stewart, Austin, TX (US); James Thompson, Austin, TX (US)

(73) Assignee: Wayport, Inc., Austin, TX (US)

( * ) Notice: Subject to any disclaimer, the term of this patent is extended or adjusted under 35 U.S.C. 154(b) by 0 days.

(21) Appl. No.: 09/433,818

(22) Filed: Nov. 3, 1999

(51) Int. Cl.⁷ .......................... G06F 17/60; H04K 1/00; H04L 9/00
(52) U.S. Cl. ....................................... 705/52
(58) Field of Search ..................... 705/76, 52

(56) References Cited

U.S. PATENT DOCUMENTS

| | | | | |
|---|---|---|---|---|
| 5,371,794 A | * | 12/1994 | Diffie et al. | 713/156 |
| 5,835,061 A | * | 11/1998 | Stewart | 342/457 |
| 5,969,678 A | * | 10/1999 | Stewart | 342/457 |
| 6,317,718 B1 | * | 11/2001 | Fano | 705/1 |

FOREIGN PATENT DOCUMENTS

| | | | | |
|---|---|---|---|---|
| EP | 915590 A2 | | 5/1999 | |
| EP | 917320 A2 | | 5/1999 | |
| EP | 000917320 A2 | * | 5/1999 | H04L/12/56 |
| EP | 000915590 A2 | * | 12/1999 | H04L/9/32 |

OTHER PUBLICATIONS

MobilStar Network, MobileStar Network First to Provide Business Travelers with High–Speed Data Access via the Internet—Wirelessly. New York, NY. Jun. 24, 1998.*

MobileStar Network, MobileStar Network First t oProvide Business Travelers with High–Speed Data Acess Via the Internet—Wirelessly, New York, NY, Jun. 24, 1998.*

* cited by examiner

Primary Examiner—James P. Trammell
Assistant Examiner—James A. Reagan
(74) Attorney, Agent, or Firm—Meyertons Hood Kivlin Kowert & Goetzel, P.C.; Jeffrey C. Hood

(57) ABSTRACT

A network communication service with an improved subscriber model. In one embodiment, a mobile user (MU), also referred to as a subscriber, may access the network service through a portable computing device (PCD) using a wireless (or wired) network interface card. Access points (APs) for the network may be widely distributed in various facilities. In one embodiment, the APs are arranged at known geographic locations and may provide geographic location information regarding the geographic location of the mobile user (MU). A digital certificate may be stored on the mobile user's PCD in order to allow access to the network. The digital certificate may store sponsorship information, including information regarding programs or entities in which the mobile user is a member or is affiliated. Each mobile user (subscriber) to the network service may have a "value bucket" which determines the amount of network access or service available to the user. Billing for access to the network communication service, i.e., the amount the "value bucket" is drained or filled, may be based on one or more of a number of factors, including information stored in the digital certificate, such as sponsorship information, the geographic location of the user, demographic information of the user, and charging information of the user.

32 Claims, 10 Drawing Sheets

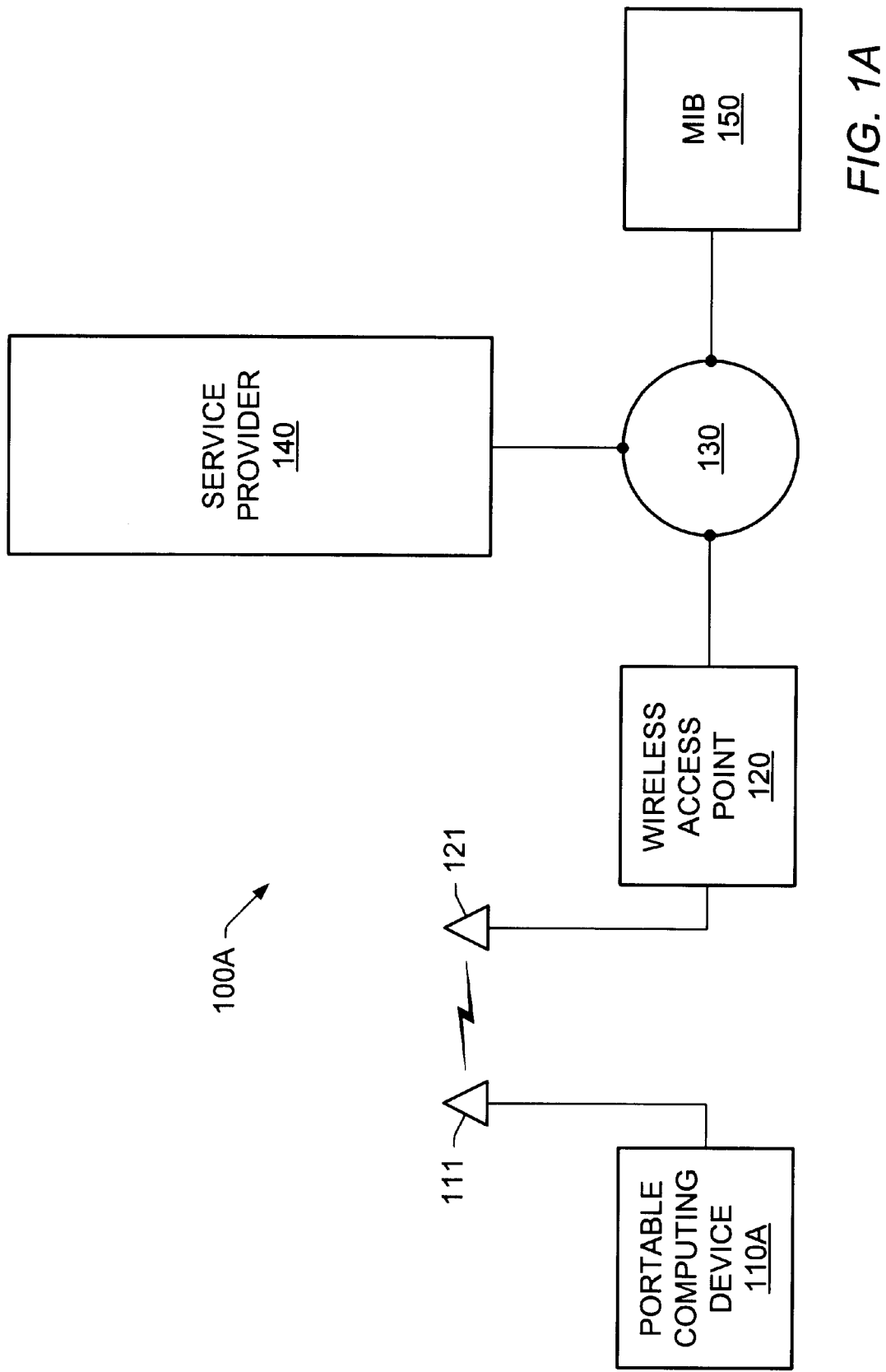

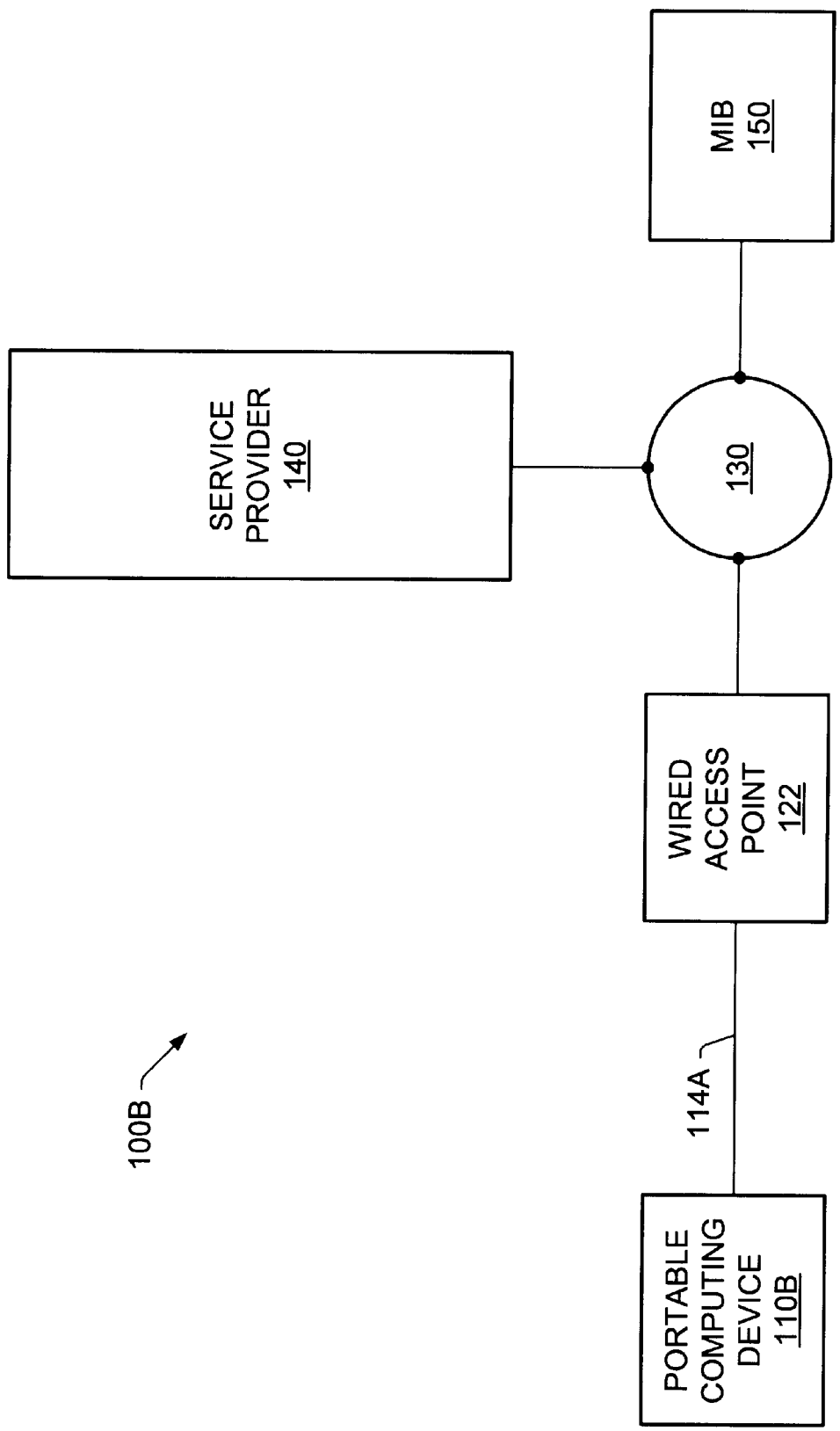

NETWORK COMMUNICATION SERVICE WITH AN IMPROVED SUBSCRIBER MODEL USING DIGITAL CERTIFICATES

BACKGROUND OF THE INVENTION

1. Field of the Invention

This invention relates generally to network communications, and more specifically to the use of digital certificates for the purposes of tracking sponsorship information or membership information of users of the network, as well as for computing billing services or network access services, and providing other services, based at least partly on the sponsorship information.

2. Description of the Relevant Art

Digital certificates are a very useful tool for Internet transactions. A digital certificate may reside in a client computer and may be used to identify the client computer. In general, digital certificates are used to authenticate users and perform secure transactions. When a client or user accesses a web site, the client computer may transmit its digital certificate to the web server. Without the use of digital certificates, user access to a web site may require registration and the use of passwords by users accessing the site. Passwords and registration information are generally inconvenient. A user typically receives different passwords and user ID information from different providers, and users may often times forget their individual passwords and IDs. Thus, digital certificates solve many of the problems associated with requiring registration and the use of passwords.

Therefore, digital certificates are useful for performing secure electronic commerce (e-commerce) transactions, and may be used to uniquely identify users. This unique identification may allow an Internet-based business gather information about customers in order to customize their access to a given web site. For example, the use of digital certificates allows a web site to restrict access, including the ability to allow different users different levels of access. A digital certificate may also allow for the instant authentication of a user without requiring the use of a user name or password.

Digital certificates are based on an encryption technology known as public/private key technology. A key is a unique encryption device, and no two keys are the same. This allows a given key to be used to identify its owner. Keys function in pairs. One key within the pair is referred to as the public key, while the other key is referred to as the private key. A public key may encrypt information to be transmitted across the Internet, and only the corresponding private key may decrypt this information. Alternatively, a private key may encrypt information to be transmitted across the Internet, and only the corresponding public key may decrypt this information. Public keys may be distributed freely to any end user who wishes to conduct secure transactions with the distributing web site, while a private key may be stored exclusively on a computer or server of the end user.

When a digital certificate is installed on the client computer of the end user, the digital certificate stores non-mutable or non-changeable information from the provider. If a server computer wishes to exchange information with the client computer of an end user, the server computer may access the digital certificate stored on the client computer, which contains the information from the certificate provider. The server computer uses its public key to ensure the contents of the certificate are valid and un-modified, and may also validate the identity of the end user and to encrypt the information to be shared. Encryption may be accomplished using Secure Sockets Layer (SSL) technology.

Digital certificates are particularly useful for providing access to network services in subscriber based services. Subscriber based services may include Internet service providers and online services. Such services typically include a billing model that charges a flat rate (e.g. a monthly rate) or a rate based on the amount of service used. However, typical billing plans lack a mechanism for accessing various customer sponsorship and demographic information, as well as geographic information. Thus this information cannot be considered when charging a customer for network access.

As the use of portable computing devices (PCD's) proliferates, a variety of new applications will emerge. Mobile users (MU's) may operate their PCD's in a stand-alone mode, but may also wish to access the Internet or other computer networks. In many cases, hard-wired links may not be available or practical, and may thus prevent the MU from communicating with the network. Furthermore, even when communications between a network and the mobile user can be established, the location of the MU (and thus the PCD) may be difficult, if not impossible to determine.

Many typical PCD's are not equipped to handle such communications scenarios. Commercially available PCD's are typically equipped with industry standard interface ports for connecting to peripheral devices such as printers, plotters, and modems. In order to gain access to a network to transmit or receive information, the user of such PCD's must usually wait until reaching an office or other location with the appropriate equipment.

By way of example and not limitation, one type of MU is the traveler who passes through airports or similar mass transit centers (e.g. subway commuters), uses ground transportation, and stays in a hotel. In a typical scenario, a traveler may use a portable computing device to perform calculations or prepare documents during an airplane flight. Simultaneously, associates may leave messages for the traveler on a network. In conventional systems, the traveler's work product and messages destined for the traveler are not available until the traveler arrives at a location where a wired connection to the traveler's network is available.

SUMMARY OF THE INVENTION

One embodiment of the present invention comprises a network communication service with an improved subscriber model. In one embodiment, a mobile user (MU), also referred to as a subscriber, may access the network service through a portable computing device (PCD) using a wireless (or wired) network interface card. Access points (APs) for the network may be widely distributed in various facilities, such as airports, mass-transit stations, and various businesses, such as coffee shops or restaurants at an airport. When in sufficiently close range to an access point, the PCD may access the service through the network card. In one embodiment, the APs are arranged at known geographic locations and may provide geographic location information regarding the geographic location of the mobile user (MU).

A digital certificate may be stored on the mobile user's PCD in order to allow access to the network. When accessing the communication service network, the identity of the user may be established by the digital certificate stored on the user's computer. The digital certificate may also store sponsorship information, including information regarding programs or entities in which the mobile user is a member or is affiliated. For example, the sponsorship information may include information regarding frequent flier program memberships (e.g., the American Airlines Advantage Program), rental car incentive programs such as Hertz Number One Club Gold, bank affiliations, country club affiliations, and other programs or affiliations of which the user is affiliated. The sponsorship information may comprise identifications or membership numbers for these various programs, e.g., the user's American Airlines Advantage Number, the user's Hertz Number One Club Gold ID #. The sponsorship information may also comprise references or cookies to more detailed sponsorship information, which may be kept on a separate server. The information may be stored in extensions within the digital certificate.

In one embodiment, as noted above, more detailed sponsorship information may be stored on a separate database server. The database server may also store personalized information or demographic information pertaining to the MU, such as contact information, credit cards held, purchasing habits, restaurant or hotel preferences, rental car preferences, past activities, etc. The database server may also store charging information used for charging the MU for network access. The charging information may comprise participation in one or more incentive programs, which may affect network access charging. In an alternate embodiment, the demographic information and/or charging information, as well as the more detailed sponsorship information may be stored in the digital certificate itself. In general, the digital certificate may include a wide variety of sponsorship, demographic, and charging information for a given user.

In one embodiment, each mobile user (subscriber) to the network service may have a "value bucket" which determines the amount of network access or service available to the user. The value bucket may be stored as a data structure or data element in a database server maintained by the network provider, and may be drained or filled based on the amount of service used or paid for by the user.

Billing for access to the network communication service, i.e., the amount the "value bucket" is drained or filled, may be based on one or more of a number of factors, including information stored in the digital certificate, such as sponsorship information, the geographic location of the user, demographic information of the user, and charging information of the user. As noted above, geographic location information of the MU may be provided to the network through the AP. This geographic location information may thus be used, in addition to other information, to adjust the billing rate or amount for network access.

For example, the owner of a business may install an access point within the business as an incentive for customers. If a subscriber to the service connects to the service within that business, free use of the service, or service at a reduced rate, may be provided during the access. During such an access, the amount of available service indicated by the value bucket may be unchanged or reduced at a lower rate than through other service accesses. In addition, sponsorship and geographic location may both be utilized in the billing model. For example, if the business has an incentive program, and if the user belongs to this incentive program as indicated by the user's digital certificate, the user may receive additional discounts on network access, or may receive "points" in the particular incentive program. As one example, the digital certificate of a user may contain information indicating the user is a member of the American Airlines Advantage program. If this user accesses the service provider's network through an access point located near an American Airlines gate or in an American Airlines Admiral's Club, American Airlines may choose to allow the user free or reduced rate access while connected to the network. The airline may also use this information to send advertisements or incentive information to the subscriber, as well as update "points" or "miles" in the user's AA Advantage account.

In another example, the purchaser of a new laptop computer may have received a given amount of pre-paid network access service with the purchase. A digital certificate stored on the computer may allow the purchaser of the computer to access the service provider network, and a value bucket filled with a predetermined amount of service for the computer may be stored in a database maintained by the network provider.

In one embodiment, the network provider acts as an infomediary for the mobile users or subscribers. In other words, the network provider may access information regarding the mobile user from the user's digital certificate, and selectively provide this information to information or service providers on the network. The network provider may selectively provide this information at the direction of the mobile user, possibly for the financial benefit of the mobile user.

Thus, in various embodiments, the network system includes an improved subscriber model which may allow mobile users convenient access to a network. The present invention provides an improved method for conveying and transmitting consumer information using digital certificates. The improved subscriber model may use sponsorship information, possibly in conjunction with demographic information, charging information, and/or geographic location information, to provide incentives for users to belong to certain sponsorship organizations, or to provide incentives for users to access the network from certain locations, such as businesses that provide an access point. The incentives may be provided in the form of reduced network access charges or in the form of benefits or "points" being applies to membership organizations of which the user is a member. The improved subscriber model may also use the above information to provide various targeted services or advertising to the user while connected to the network.

BRIEF DESCRIPTION OF THE DRAWINGS

Other objects and advantages of the invention will become apparent upon reading the following detailed description and upon reference to the accompanying drawings in which:

FIG. 1A is a block diagram of one embodiment of a geographic based wireless communication system;

FIG. 1B is a block diagram of one embodiment of a geographic based wired communication system;

Figure 1C:
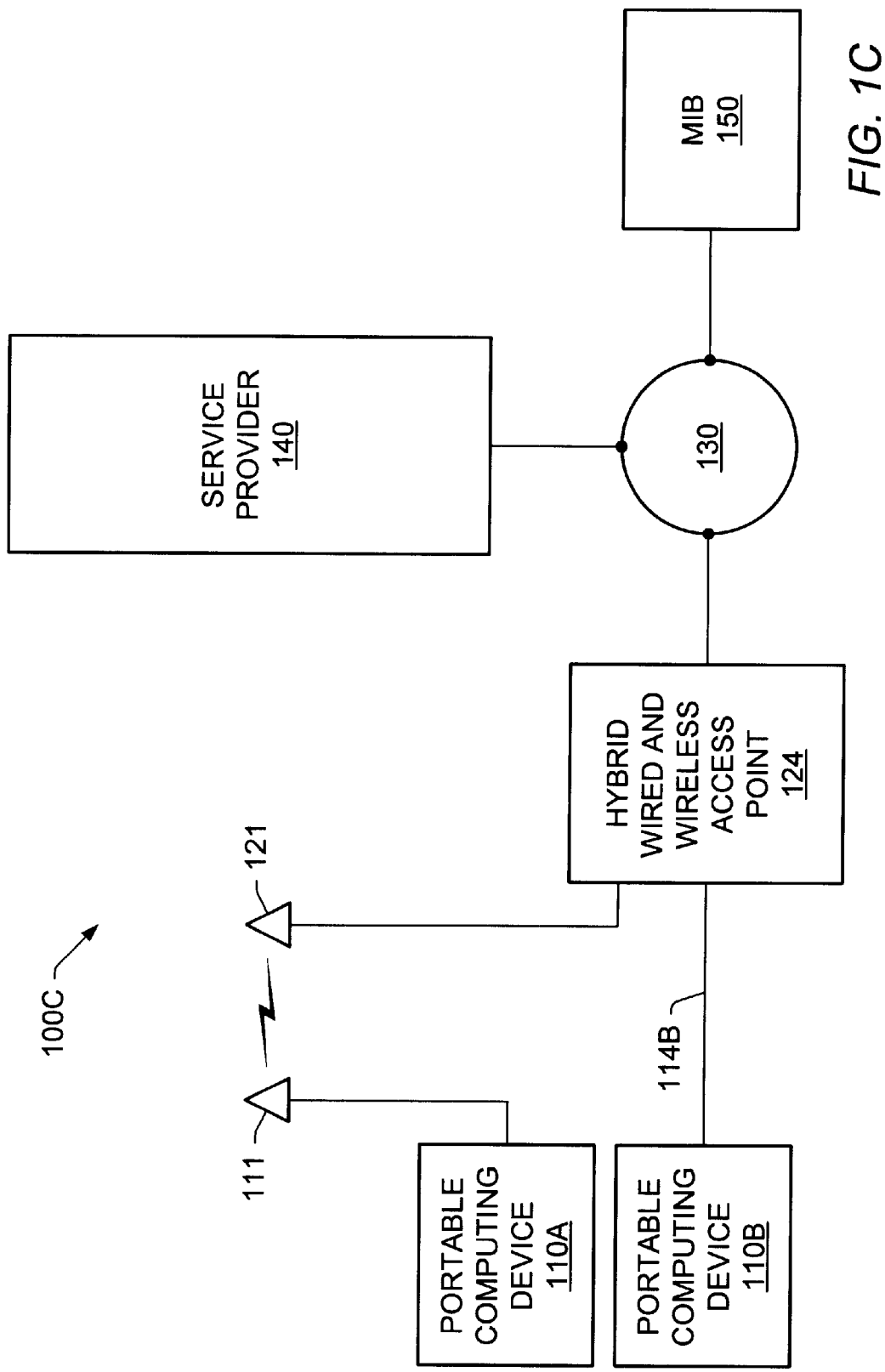
FIG. 1C is a block diagram of one embodiment of a geographic based hybrid (wired and wireless) communication system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Pat. No. 5,835,061, titled "Method and Apparatus for Geographic-Based Communications Service", whose inventor is Brett B. Stewart, is hereby incorporated by reference in its entirety as though fully and completely set forth herein.

U.S. Pat. No. 5,969,678, titled "System for Hybrid Wired and Wireless Geographic-Based Communications Service", whose inventor is Brett B. Stewart, is hereby incorporated by reference in its entirety as though fully and completely set forth herein.

U.S. patent application Ser. No. 09/433,817 titled "Geographic Based Communications Service" and filed on Nov. 3, 1999, whose inventors are Brett B. Stewart and James Thompson, is hereby incorporated by reference in its entirety as though fully and completely set forth herein.

FIG. 1A—Wireless Network Communication System

FIG. 1A shows one embodiment of a wireless network communication system 100A. The wireless network communication system 100A may include a portable computing device (PCD) 110A with a wireless connection 111 (e.g., an antenna) in communication with a wireless access point (AP) 120 having a wireless connection 121 (e.g., an antenna). The AP 120 may be coupled to a service provider 140 and a management information base (MIB) 150 through a centralized network 130. The network 130 may comprise a wired network, a wireless network or a combination of wired and wireless networks. The network communication system 100A may be geographic-based. In other words, the network communication system 100A may provide information and/or services to the MU based at least partly on the known geographic location of the MU, e.g., as indicated by the access points 120 or as indicated by geographic information (e.g., GPS information) provided from the PCD 110A.

The wireless communication system 100A may include a plurality of wireless access points 120, a plurality of service providers 140, and/or a plurality of MIBs 150. Access points (APs) for the network may be widely distributed in various facilities, such as airports, mass-transit stations, shopping malls, and other businesses, such as coffee shops or restaurants at an airport. When in sufficiently close range to an access point, the PCD 110A may access the network through, for example, a wireless network card. In one embodiment, the APs 120 are arranged at known geographic locations and may provide geographic location information regarding the geographic location of the mobile user (MU) or the PCD 110A. In another embodiment, the PCD 110A may provide geographic location information of the PCD 110A through the AP 120 to the network 130. For example, the PCD 110A may include GPS (Global Positioning System) equipment to enable the PCD 110A to provide its geographic location through the AP 120 to the network 130, e.g., service provider 140 located on the network 130.

The service providers 140 and MIBs 150 each may comprise a computer system coupled to the network 130. The network 130 may comprise one or more wired or wireless local area networks and/or one or more wide area networks (e.g., the Internet). Each service provider 140 may include one or more computers or computer systems configured to provide goods, information, and/or services as appropriate for the service provider. The one or more service providers 140 may connect to network 130 in a wired or wireless fashion. The one or more MIBs 150 may be comprised in a service provider 140.

The wireless communication may be accomplished in a number of ways. In a preferred embodiment, PCD 110A and wireless AP 120 are both equipped with an appropriate transmitter and receiver compatible in power and frequency range (e.g., 2.4 GHz) to establish a wireless communication link (e.g., wireless connection 111 and wireless connection 121, respectively). Wireless communication may also be accomplished through cellular, digital, or infrared communication technologies, among others. To provide user identification and/or ensure security, the MU may also be equipped with a code generator that generates an identification code that may be transmitted to and recognized by the wireless AP 120. This identification code may then be relayed to different service providers 140 and/or MIB 150 that are coupled to wireless AP 120 via centralized network 130. Such an identification code may utilize recognition of a MU before providing access to system services, thereby providing a measure of security and a service billing mechanism. The identification code may also identify the user to enable a service provider to use known information regarding the user or use demographic information in conjunction with the known geographic location to provide specific information (e.g., advertising) to the user.

FIG. 1B—Wired Network Communication System

FIG. 1B shows one embodiment of a wired network communication system 100B. The system may include the same components as discussed in FIG. 1A with the following substitutions: PCD 110A is replaced with PCD 110B, wireless connections 110 and 121 are replaced with wired connection 114A, and wireless access point 120 is replaced with wired access point 122.

The wired connection 114A may be accomplished through a variety of different ports, connectors, and transmission mediums. For example, the PCD 110B may be connected through an Ethernet, USB, serial, or parallel transmission cables, among others. The PCD 110B may also include various communication devices for connect to the AP 122, such as wired Ethernet cards, modems, DSL adapters, ATM adapters, IDSN devices, or other communication devices. For example, a hotel may have Ethernet connections throughout the hallways, restaurants, shops, and guest rooms. An airport Admiral's Club may also have wired connections for mobile users. A MU may connect to a wired access point 122 through the use of a laptop computer (PCD 110B), an Ethernet network card, and a network cable. This connection may have the same impact as a connection made to a wireless AP 120 as discussed above. In other words, a MU using PCD 110B is able to send and receive the same information to/from information and service providers as a MU using PCD 110A in the same geographic area.

FIG. 1C—Hybrid Wired and Wireless Network Communication System

FIG. 1C shows one embodiment of a hybrid (wired and wireless) network communication system 100C. The system may include the same components as discussed in both FIGS. 1A and 1B combined, with the following substitutions: wired connection 114A is replaced with wired connection 114B, and wireless access point 120 and wired access point 122 are replaced with hybrid wired and wireless access point 124. The embodiment of FIG. 1C allows either a wireless or a wired connection to be made between a MU's PCD and a hybrid wired and wireless AP 124: the MU would use PCD 110A for a wireless connection and PCD 110B for a wired connection.

As described above with respect to FIG. 1A, a wireless communication may be accomplished in a number of ways. Also, the wired connection 114B may be accomplished in a number of ways, as described in FIG. 1B. Both connections (wired and wireless) may communicate in substantially the same manner as the other. In other words, a MU using PCD 110B is able to send and receive the same information to/from information and service providers as a MU using PCD 110A in the same geographic area.

In another embodiment, the network system includes one or more wireless access points 120 and one or more wired access points 122, in addition to, or instead of, the hybrid wired and wireless AP 124. Thus, some APs in the network may offer wired connections, while other access points in the network offer wireless connections.

Figure 2A:
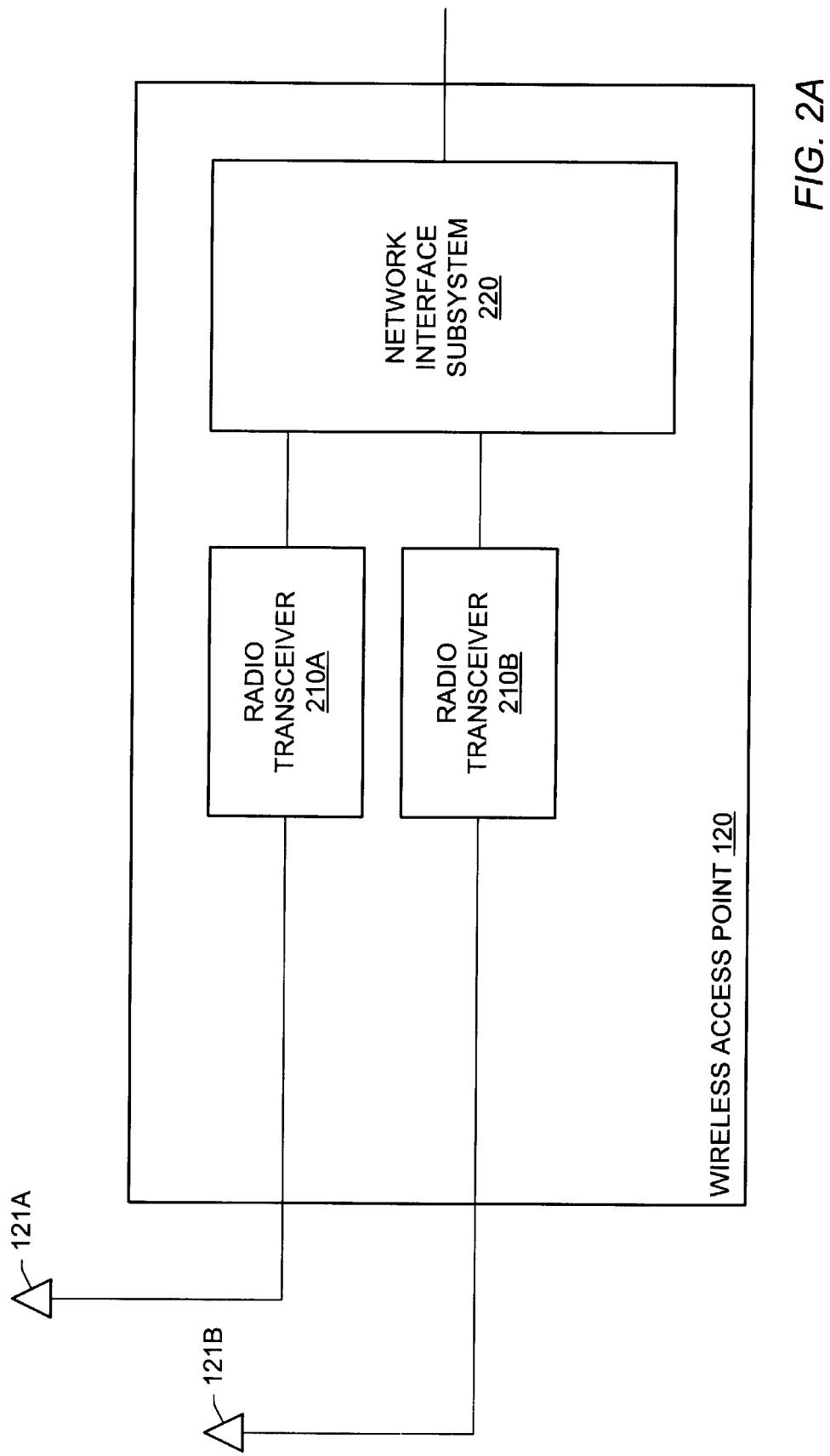
FIG. 2A is a block diagram of one embodiment of a wireless Access Point (AP)

FIG. 2A—Wireless Access Point

FIG. 2A is a block diagram of one embodiment of a wireless access point (AP) 120. The wireless AP 120 may comprise a network interface subsystem 220 coupled to radio transceiver 210A and radio transceiver 210B. Both radio transceiver 210A and radio transceiver 210B are coupled to antennas 121A and 121B, respectively.

A transceiver is an electrical component that comprises one or both of a transmitter and a receiver. For example, an Ethernet transceiver contains electronics that apply signals to the cable and sense incoming signals and collisions. In one embodiment of the present invention, radio transceiver 210A receives communications from PCD 110A and radio transceiver 210B transmits communications to PCD 110A. In another embodiment, radio transceiver 210A receives and transmits from/to a PCD 110A while radio transceiver 210B receives and transmits from/to a different PCD 110A. In either embodiment the transmitted information may contain security data or encoding that prevents others from receiving and decoding the transmitted data.

The network interface subsystem 220 may be configured to receive information from both service providers 140 and MIB 150 via centralized network 130. The network interface subsystem 220 may provide signals to the centralized network 130 over a wired connection or wireless connection. The network interface subsystem 220 determines the proper radio transceiver (such as 210A or 210B), frequency, modulation, and signal power for transmitted and received data. For example, each PCD 110A may communicate with wireless AP 120 using a selected multiple access scheme such as CDMA, FDMA, or TDMA. When a wireless connection is initially made between a PCD 110A and wireless AP 120, parameters such as frequency, time slot and/or code of the wireless connection may be determined. This determination may be used to ensure that only a particular PCD 110A receives the transmitted data intended for that particular PCD 110A and that wireless AP 120 knows, when it receives data from a PCD 110A, which PCD 110A the received data is from. This is important when there are multiple MUs concurrently communicating with one wireless AP 120.

The network interface subsystem 220 may also contain a memory. This memory may be used to store information specific to a particular wireless AP 120, such as geographic location of the wireless AP 120, a map of the local area, and an index of local services. This memory allows many requests for information by a MU using PCD 110A to be responded to without accessing a service provider 140 or a MIB 150.

The antennas 121A and 121B may be any of a number of different antenna types. The type of antenna used may be specific to the type of wireless communication used. The antenna that is used may have an impact on the area that a particular wireless AP 120 may service. For example, a small antenna may be able to communicate only with a MU using PCD 110A within a radius of five feet, while a larger and/or more powerful antenna may be able to communicate with MUs using PCD 110A throughout an entire building.

Figure 2B:
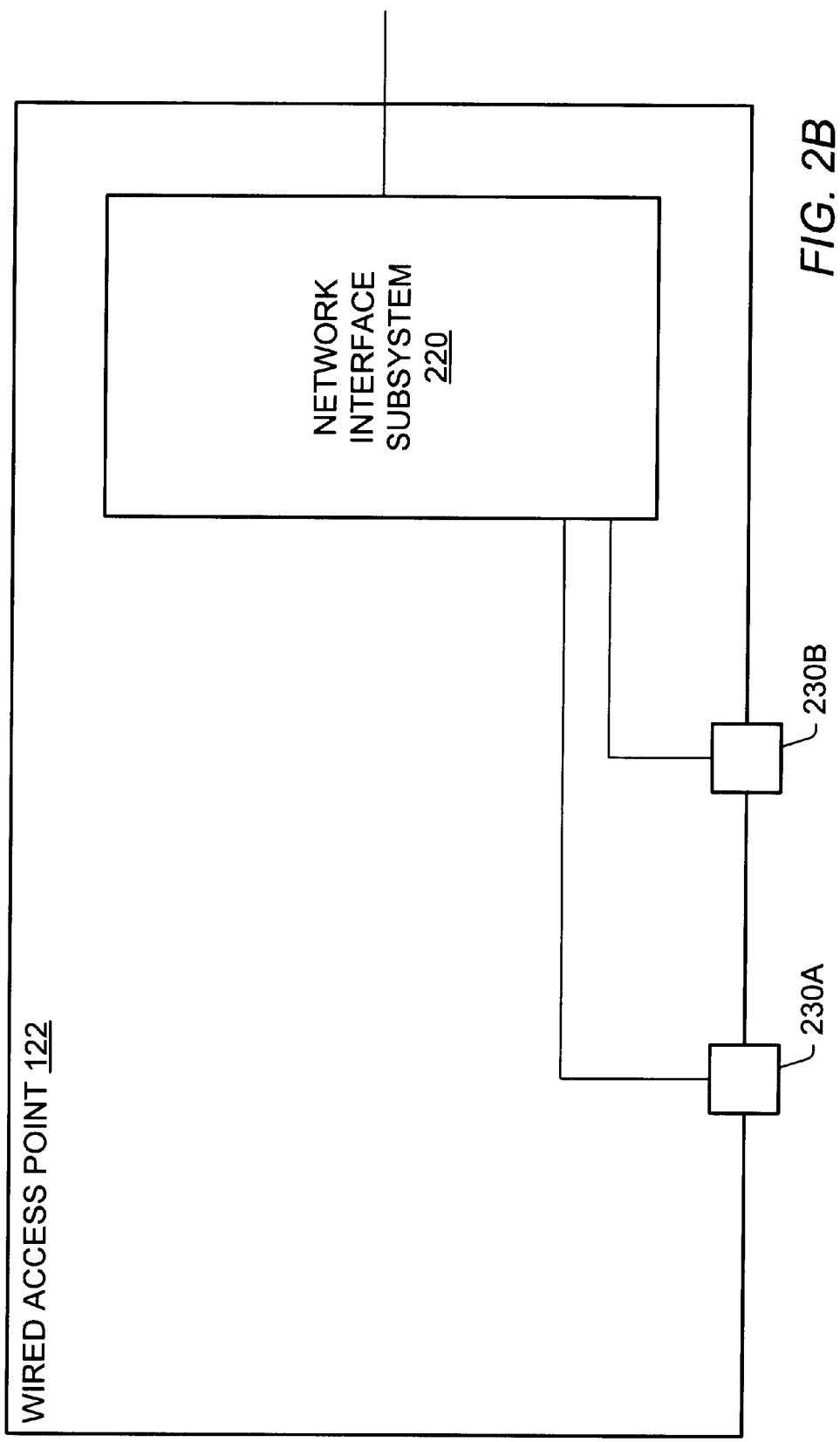
FIG. 2B is a block diagram of one embodiment of a wired Access Point (AP)

FIG. 2B—Wired Access Point

FIG. 2B is a block diagram of one embodiment of a wired access point (AP) 122. The wired AP 122 comprises a network interface subsystem 220 coupled to input/output data ports 230A and 230B.

Wired AP 122 accomplishes substantially the same results as wireless AP 120, but through a physical connection between PCD 110B and wired AP 122. One function of a network interface subsystem 220 may be to determine which port data are received from and to which port data are transmitted. For example, a network interface subsystem 220 may have 20 input/output data ports 230. The MU using PCD 110B and wired AP 122 may communicate through a particular data port 230, independent of another MU using another PCD 110B on a different data port 230. Furthermore, data that is transmitted through data ports 230 may be encoded so that only the appropriate MU using a particular PCD 110B may decode the data.

The data ports 230 may be any of a number of data ports. Data ports that are commonly used for wired communication include Ethernet, USB, IEEE 1394, serial, and parallel, among others. A particular wired AP 122 may comprise a variety of different types of data ports. For example, a wired AP 122 may comprise twelve data ports: five Ethernet ports, five USB ports, and two serial ports.

In one embodiment, the wired AP 122 includes one or more internal modems, such as described in co-pending U.S. patent application Ser. No. 09/304,138, hereby incorporated by reference in its entirety. Thus, a data port 230 coupled to the internal modem may allow for a MU using a PCD 110B with a modem to connect to the AP 122 at a maximum or guaranteed transfer rate.

Figure 2C:
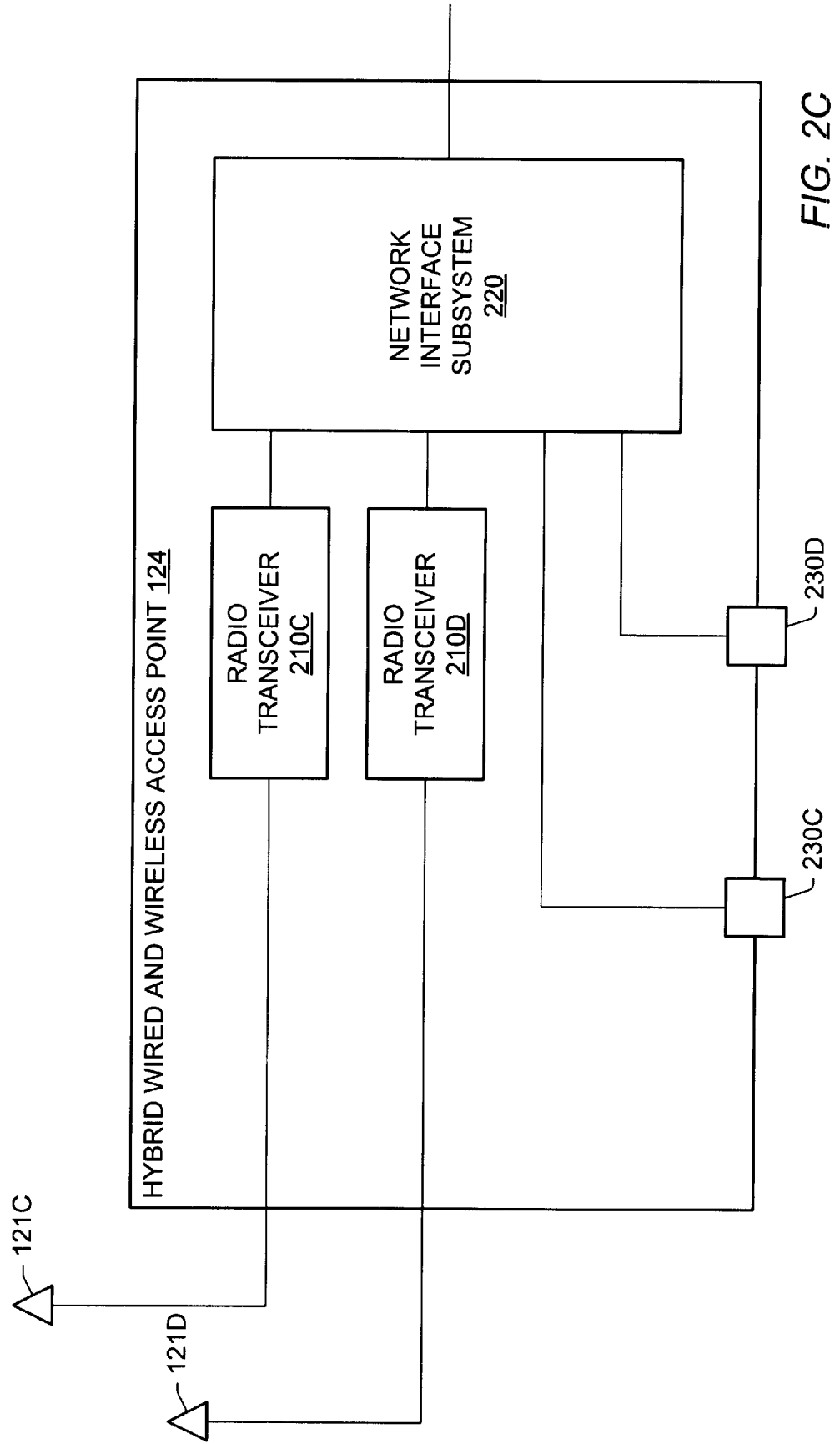
FIG. 2C is a block diagram of one embodiment of a hybrid (wired and wireless) Access Point (AP)

FIG. 2C—Hybrid Wired and Wireless Access Point

FIG. 2C is a block diagram of one embodiment of a hybrid wired and wireless access point (AP) 124. The hybrid wired and wireless AP 124 comprises a network interface subsystem 220 coupled to input/output data ports 230C and 230D and also coupled to radio transceivers 210C and 210D. Both radio transceiver 210C and radio transceiver 210D are coupled to antennas 121C and 121D, respectively.

The network interface subsystem 220 controls what is sent/received to/from radio transceivers 210C and 210D as well as data ports 230C and 230D. The hybrid wired and wireless AP 124 allows both MUs using PCD 110Bs (wired) and MUs using PCD 110As (wireless) access to the same access point, i.e., to the same network interface subsystem 220. This may be accomplished through any combination of wired and wireless data ports as discussed above. For example, a hybrid wired and wireless access point 124 may comprise an Ethernet data port, a USB data port, a high frequency radio transceiver, and an infrared transceiver.

Network 130

The network 130 is preferably the Internet. Network 130 may include or be connected to other types of communications networks, (e.g., other than the Internet) such as the public switched telephone network (PSTN), whereby a MU using PCD 110B may send and receive information from/to the PSTN or other communication network through a service provider. The network 130 may also include, or be coupled to, another wide area network 130, such as a proprietary WAN. The network 130 thus may be any of various wide area networks (WANs) or local area networks (WANs), including the Internet.

Where the user connects, for example, to the network 130 through the PSTN, the MU using PCD 110B may dial a service provider 140 using a modem connected to a phone. The geographic location of the phone may be known, e.g., the geographic location of the phone has been entered into a database (e.g., MIB 150), which can be cross-referenced by a service provider. The service provider 140 would employ processors and other apparatus to convert protocols and data formats from those used on the network 130 to those compatible with the PSTN or other communication network.

For example, the user may receive facsimile information from a PSTN connected to the network 130.

Figure 3A:
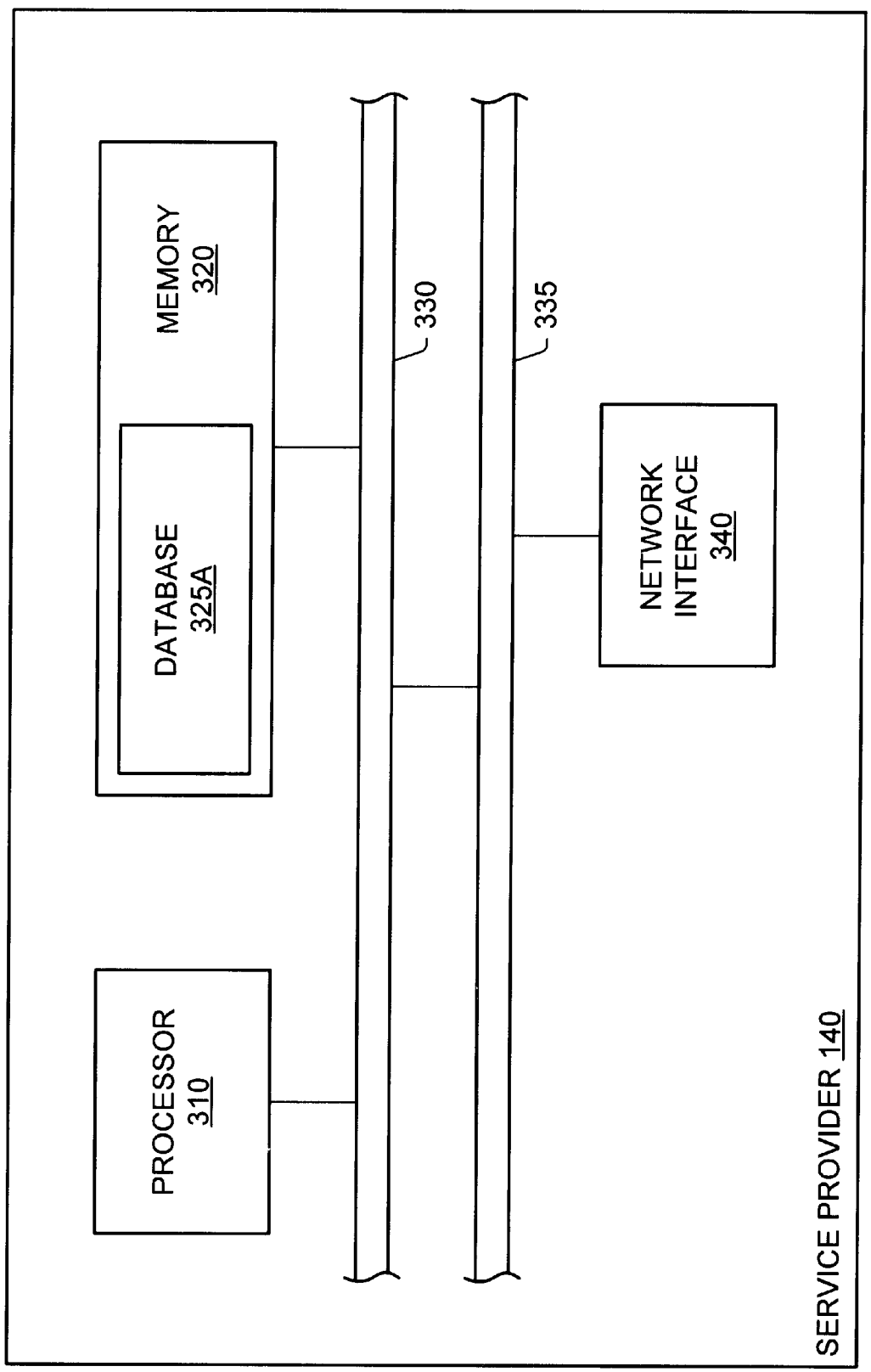
FIG. 3A is a block diagram of one embodiment of a computer system of a Service Provider.

FIG. 3A—Service Provider

FIG. 3A is a block diagram of one embodiment of a service provider computer 140. As used herein, the term "service provider" is intended to include various types of service and information providers which may be conntected to the network. The service provider computer 140 may take any of various forms, and FIG. 3A is exemplary only. The service provider 140 may comprise a processor 310 coupled to a system bus 330. A database 325A and memory 320 may also be coupled to the system bus 330. System bus 330 is coupled to I/O bus 335. Network interface 340 may also be coupled to I/O bus 335. System bus 330 and I/O bus 335 may be coupled to other devices, such as a display.

Processor 310 may be any of several different processors. Processor 310 may be operable to receive a digital certificate from a PCD of a mobile user and extract various information from the digital certificate, such as a user identification and sponsorship information. The sponsorship information may comprise identifications or membership numbers for various programs, as well as references or cookies to more detailed sponsorship information, which may be kept on a separate database server. The sponsorship information may be stored in extensions within the digital certificate, such as non-critical extensions. The processor 310 may use this sponsorship information in the digital certificate to access more detailed sponsorship information from a database (e.g., database 325A). The processor 310 may also access other information from the database (e.g., database 325A), such as demographic information and/or charging information. This information may be used, possibly in conjunction with geographic location information of the PCD, to provide targeted services or information (e.g., advertising information) to the mobile user. The service provider computer 140 may receive information or service requests from network 130, determine what information fulfills each request, and make the information available to the network 130 through network interface 340.

The database 325A may store various types of information, such as sponsorship information of the user, demographic information of users, charging information of the user, or other information. The database 325A may store user specific information relative to a specific MU or a groups of MUs. In one embodiment, a user's data may only be available to registered network users using an access code that has been approved by the MU. Alternatively, the database 325A may selectively store information received from a user, based on a permission received from the respective user. This information may be selectively provided by the service provider 140, possibly upon the approval of the MU. Thus the service provider 140 may act as an infomediary for MUs.

In another embodiment, the database 325A does not store information received from a user, but rather this information is stored only on the user's PCD and thus is entirely within the user's control.

FIG. 3B—MIB

Figure 3B:
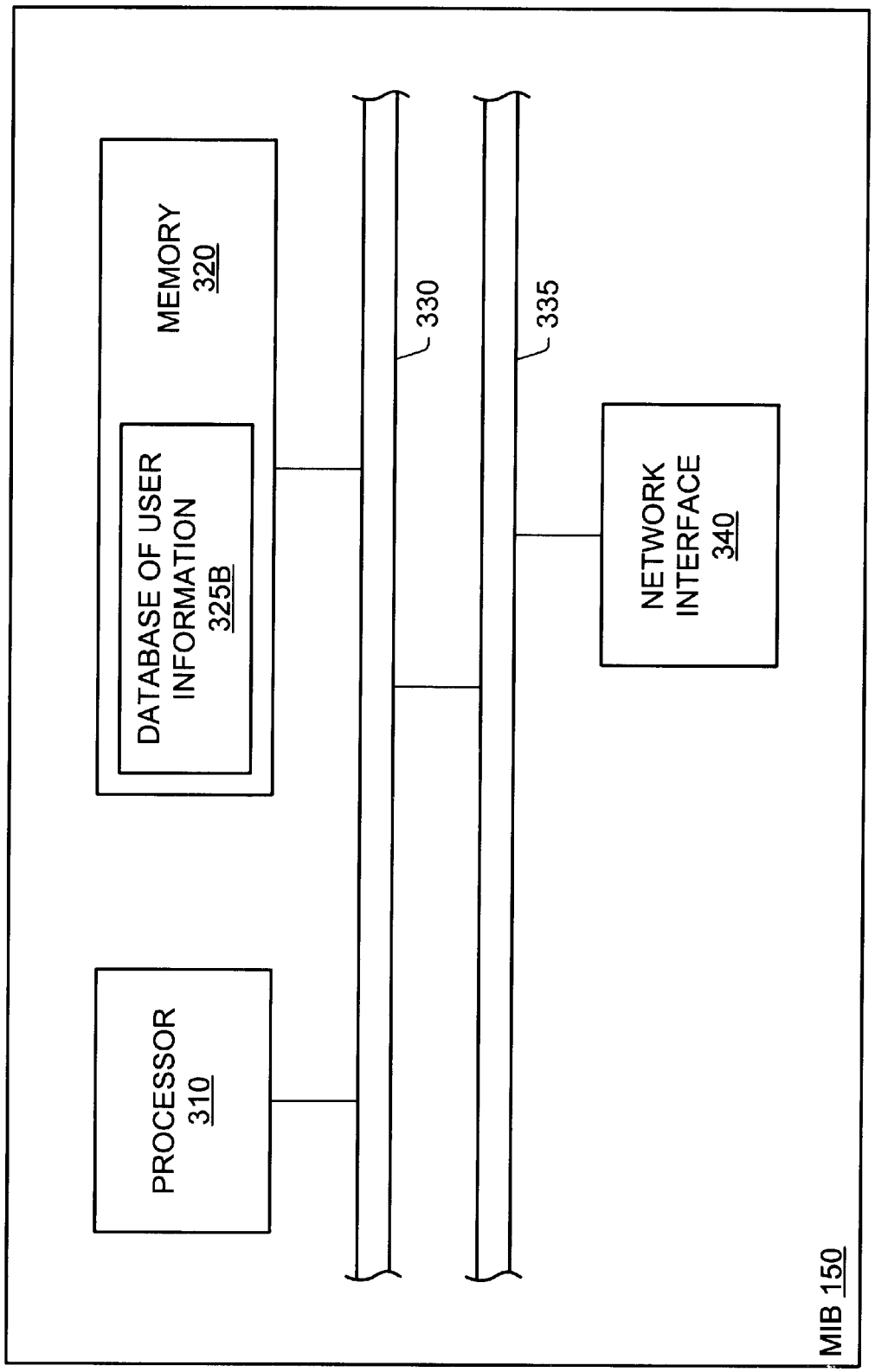
FIG. 3B is a block diagram of one embodiment of a Management Information Base (MIB)

FIG. 3B is one embodiment of a block diagram of a management information base 150 (MIB). The MIB 150 may take any of various forms, and FIG. 3B is exemplary only. The MIB 150 may comprises a processor 310 coupled to a system bus 330. A database of user information 325B and memory 320 may also be coupled to the system bus 330. System bus 330 is coupled to I/O bus 335. Network interface 340 may also be coupled to IO bus 335.

The MIB 150 may be a mechanism, such as a memory, which may allow the persistent storage and management of information needed by network 130 to operate. Examples of such information include a directory of all the elements (e.g., APs, PCDs, etc) in the network, the topology of the network, characteristics of individual network elements, characteristics of connection links, performance and trend statistics, and any information which is of interest in the operation of the network 130. For example, the MIB may store the precise longitude, latitude, altitude and other geographic information pinpointing the location of each access point.

The MIB 150 may also store various types of information, such as demographic information of users, sponsorship information of the user, charging information of the user, or other information, similar to database 325A.

In one embodiment, the MIB 150 stores a "value bucket" associated with the user which determines the amount of network access or service available to the user. The value bucket may be stored as a data structure or data element in a database server maintained by the network provider, and may be drained or filled based on the amount of service used or paid for by the user.

Billing for access to the network communication service, i.e., the amount the "value bucket" is drained or filled, may be based on one or more of a number of factors, including information stored in the digital certificate, such as sponsorship information, the geographic location of the user, demographic information of the user, and charging information of the user. As noted above, geographic location information of the MU may be provided to the network through the AP. One or more of sponsorship information, demographic information, charging information, and geographic location information may be used to adjust the billing rate for network access or the amount of available network access. This information may also or instead be used to adjust credits, e.g., "points", "miles", or other types of credits in various incentive programs.

As described above with respect to the database 325A, the MIB 150 may store user information that may only be available to registered network users using an access code that has been approved by the MU. Alternatively, the MIB 150 may selectively store user information, based on a permission received from the respective user. This information may be selectively provided by the MIB 150, possibly upon the approval of the MU. Thus the MIB 150 may act as an infomediary for MUs. In another embodiment, the MIB 150 does not store information received from a user, but rather this information is stored only on the user's PCD and thus is entirely within the user's control.

In order to reduce message traffic over the network, all or part of MIB 150 may be stored at one or more access points. In particular, static information that does not change, or changes relatively infrequently, may be stored at each access point. For example, an AP 120 may store the geographic location of the AP 120, the local map, local services and other information, such that routine requests for information from PCDs, such as "Where am I?" need not be serviced over the network, leaving more resources for other message traffic. In addition, MIB 150 may be stored among distributed servers, as desired.

Portable Computing Device

The portable computing device 110A or 110B (referred to generally as PCD 110) may be any of various types of devices, including a computer system, such as a portable computer, a personal digital assistant (PDA), an Internet appliance, a communications device, such as a cellular phone, digital wireless telephone, or other wired or wireless device. The PCD may include various wireless or wired communication devices, such as a wireless Ethernet card, cellular telephone logic, paging logic, RF communication logic, a wired Ethernet card, a modem, a DSL device, an ISDN device, an ATM device, a parallel or serial port interface, or other type of communication device. As mentioned above, the PCD 110 preferably includes a memory which stores a digital certificate. The digital certificate may also be referred to as a personal certificate. The digital certificate may be stored in a web browser of the personal computing device 110. The digital certificate may store information need for user authentication and security on the network.

The digital certificate may also store various information, such as sponsorship information of the user. The sponsorship information may be stored in extensions within the digital certificate, such as non-critical extensions of the digital certificate. As noted above, the sponsorship information may include information regarding programs or entities in which the mobile user is a member or is affiliated. For example, the sponsorship information may include information regarding frequent flier program memberships (e.g., the American Airlines Advantage Program), rental car incentive programs (e.g., Hertz Number One Club Gold), bank affiliations, country club affiliations, and other programs or affiliations, such as other incentive programs, preferred status memberships, other programs sponsored by vendors of goods or services, and other organizations of which the user is affiliated. The sponsorship information thus may take any of various forms.

In one embodiment, the sponsorship information comprised in the digital certificate may comprise identifications or membership numbers for these various programs, e.g., the user's American Airlines Advantage Number, the user's Hertz Number One Club Gold ID #, and membership IDs for other programs or entities. The sponsorship information may also comprise references or cookies to more detailed sponsorship information, which may be kept on a separate server. The references or cookies may take the form of a URL, a pointer, an IP address, or other reference or cookie. Thus the sponsorship information comprised in the digital certificate may comprise only that information which changes infrequently, while providing valuable information on sponsorships or memberships of the user. The sponsorship information may also consume less memory space.

In one embodiment, as noted above, more detailed sponsorship information may be stored on a separate database server. As one example, the digital certificate may store a user's American Airlines Advantage Number and a cookie or reference to a database which contains detailed information on the user's American Airlines Advantage membership, such as number of miles, expiration dates, travel itinerary history, etc. As another example, the digital certificate may store a user's Hertz Number One Club Gold ID and a cookie or reference to a database which contains detailed information on the user's Hertz Number One Club Gold membership, such as rental car preferences, prior rental history, etc.

The database server may also store personalized information or demographic information pertaining to the MU. In the present disclosure, the term "demographic information" of a user is intended to include, but is not limited to, information such as: full name, address, contact information such as telephone number and email address, daily schedule, family members, hobbies, past purchases, credit cards held, spending habits, buying preferences, hotel preferences, restaurant preferences, rental car preferences, banking habits, memberships (e.g., American Airlines Advantage Program, Herts Number One Club Gold), associations, and other information. The term "past activities" may be used synonymously with the term "demographic information".

The database server may also store charging information used for charging the MU for network access. The charging information may include information regarding participation in various incentive programs which may affect network access charging, e.g., programs which offer a limited time period of free or reduced charge network access. The charging information may also include information regarding an amount of available network access usage, e.g., a time amount, a dollar amount, or an amount of accrued "points". For example, the amount of "points" may indicate an amount of network usage available to the user.

In an alternate embodiment, the demographic information and/or charging information, as well as the more detailed sponsorship information may be stored in the digital certificate itself. In general, the digital certificate may include a wide variety of sponsorship, demographic, and charging information for a given user. In the preferred embodiment, the digital certificate stores information which changes infrequently, and may store references to one or more databases that contain data which changes more frequently.

Memory Medium and Carrier Medium

One or more of the systems described above, such as PCD 110, service provider 140, MIB 150, or AP 120 may include a memory medium on which computer programs or data (e.g., a digital certificate) according to the present invention may be stored. The term "memory medium" is intended to include various types of memory or storage, including an installation medium, e.g., a CD-ROM, or floppy disks 104, a computer system memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, each of the systems described above may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium in one or more of the above systems may store a software program or data for performing or enabling a network communication service with an improved subscriber model using digital certificates. A CPU or processing unit in one or more of the above systems executing code and data from a memory medium comprises a means for creating and executing the software program according to the methods or flowcharts described below.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Figure 4:
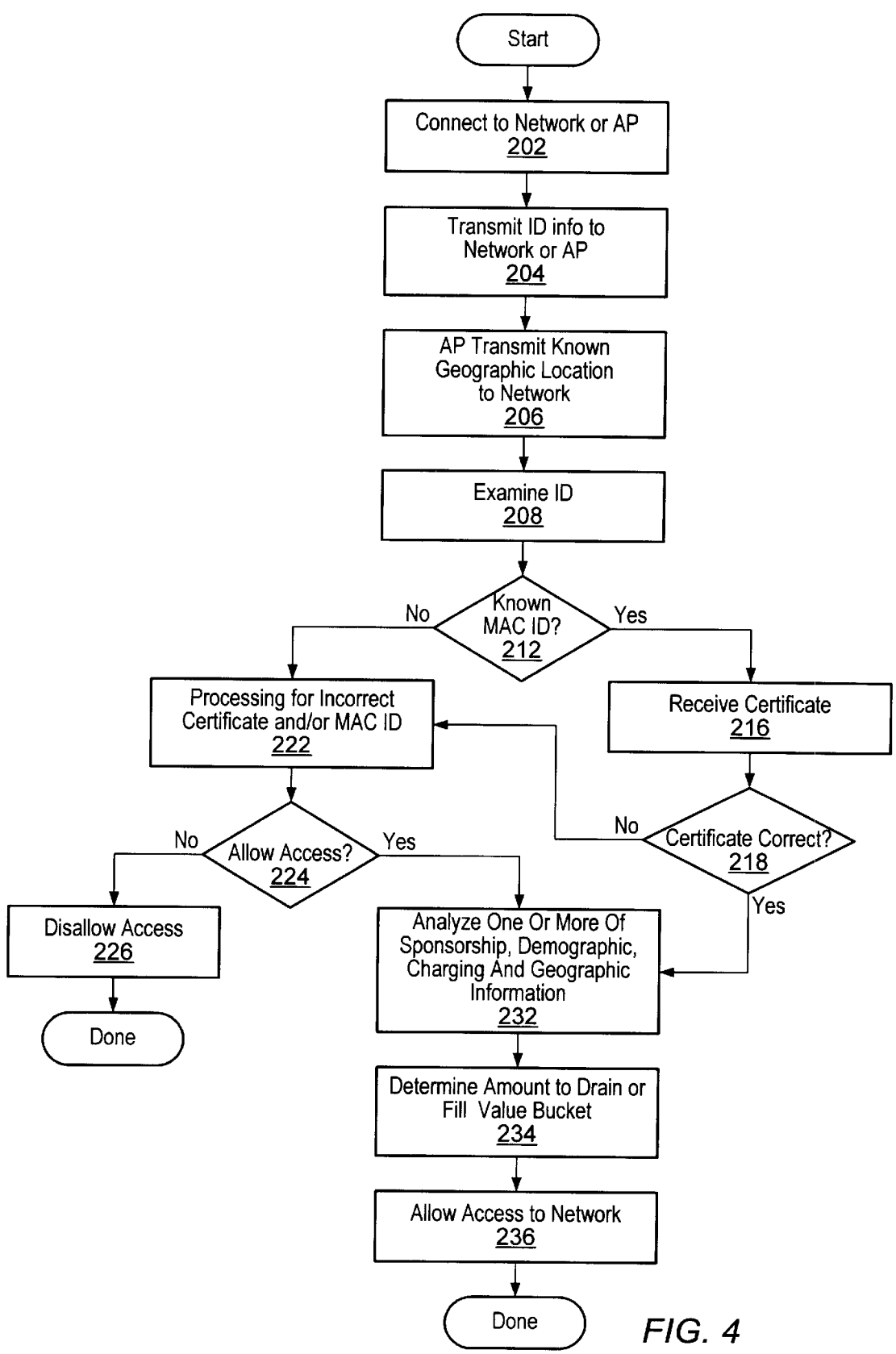
FIG. 4 is a flowchart diagram illustrating operation of allowing access to a network using an improved subscriber model.

FIG. 4—Network Access using the Improved Subscriber Model

FIG. 4 is a flowchart diagram illustrating operation of allowing access to a network using an improved subscriber model. In one embodiment, as described above, the PCD 110 includes a digital certificate stored in the memory of the PCD. The digital certificate may store information need for user authentication and security on the network. The digital certificate may also store various information, such as sponsorship information of the user, as described above. The sponsorship information may comprise references to more detailed sponsorship information stored on a separate server database as described above. The digital certificate may also store references to other information, such as demographic information of the user, charging information of the user, or other information.

The network access method of the present invention may be operable to receive and use the digital certificate for authentication and security. In one embodiment, the system and method may extract and use information stored in the digital certificate, possibly in conjunction with geographic location information of the mobile user and other information, to provide an improved network access billing model. The system and method may also extract and use information stored in the digital certificate, possibly in conjunction with geographic location information of the mobile user and other is information, to provide various targeted services or information.

As shown, in step 202 the user connects to the network (e.g., to an access point of the network). For example, the user may be walking in an airport with a portable computing device and may connect in a wireless fashion to an access point located at the airport. In another scenario, the user may enter a hotel room and connect to an Ethernet port in his/her room which is connected to the network. Thus, the user may connect to the network or an access point of the network in a wired or wireless fashion.

In step 204 the personal computing device (PCD) of the user transmits identification information (ID information) to the network or to the access point (AP) of the network. The identification information may take any of various forms. In one embodiment, the identification information comprises a MAC (media access controller) ID which is comprised on a wired or wireless Ethernet card of the personal computing device used by the user. The identification information may comprise other types of more secure identification as desired.

In step 206 the access point to which the user has connected may transmit known geographic location information to the network (e.g., an information provider on the network). As discussed further below, this known geographic location information may be used to provide services to the user which are dependent upon the geographic location of the user. For more information on the use of geographic location information for providing geographic based services, please see U.S. Pat. No. 5,835,061, referenced above.

In step 208 the network provider may examine the received identification information, e.g., the MAC ID or other identification information.

In step 212 the method determines if the identification information (e.g., the MAC ID) is valid. If the MAC ID is determined to not be a known MAC ID by the network provider, then in step 222 the method may perform processing to account for the unknown MAC ID. Step 222 may also involve performing processing for an unknown or incorrect digital certificate, as discussed further below.

If a known MAC ID is determined to be received in step 212, then in step 214 the method receives a digital certificate from the personal computing device (PCD) of the user. The network provider may request and receive the digital certificate, or the PCD may automatically transfer the digital certificate with or after transfer of the ID information in step 204. The digital certificate may also be referred to as a personal certificate. The digital certificate may be stored in a web browser of the personal computing device. As discussed above, the digital certificate may include sponsorship information of the user, and may include other information or references to other information.

In step 218 the network provider determines if a correct digital certificate was received. Step 218 may involve the network provider comparing the received certificate against a database of valid digital certificates which are authorized to have access on the network.

If it is determined that a correct digital certificate was not received in step 218, operation proceeds to step 222. As mentioned above, step 222 may involve the method performing processing to handle an unknown MAC ID and/or incorrect or non-received certificate. If the processing performed in step 222 indicates that the user is allowed access to the network, then operation proceeds to step 232. If the processing performed in step 222 indicates that the user is not allowed access to the network, then network access may be disallowed in step 226.

If a correct digital certificate is determined to have been received in step 218, then in step 232 the method analyzes or determines information which was conveyed with the digital certificate. According to one embodiment of the present invention, sponsorship information may be included in the the certificate provided by the user and received by the network provider in step 216. As mentioned above, a digital certificate may include one or more extensions, e.g., non-critical extensions, and this information may be comprised in these extensions. A portion or all of this information, possibly in conjunction with other information, may be evaluated in step 232. For example, the network provider may analyze the sponsorship information, as well as various types of other information obtained from a database server, such as demographic information and/or charging information, as well as known geographic location information. Thus the network provider may analyze one or more of sponsorship information, demographic information, charging information, or known geographic location information.

In step 234, the method may determine the amount to "drain" or "fill" the "value bucket" of the user. In other words, in step 234 the method determines the amount (e.g., the time amount, dollar amount, or a number of points), or the change in amount, representing the charged amount or the amount of available access to the network. This amount may be based on a portion or all of the information comprised within the digital certificate, and possibly may depend on the known geographic location of the user, or both, and may further depend on other information stored in a database of the network, such as demographic information and/or charging information.

The amount to drain or fill this value bucket may depend on a particular sponsorship program offered by a particular provider of goods or services, and may also depend on the user's geographic location (e.g., whether the use is located in a store of the respective vendor of goods or services).

For example, the owner of a business may install an access point within the business as an incentive for customers. If a subscriber to the service connects to the service within that business, free use of the service, or service at a reduced rate, may be provided during the access. During such an access, the amount of available service indicated by the value bucket may be unchanged or reduced at a lower rate than through other service accesses. In addition, sponsorship and geographic location may both be utilized in the billing model. For example, if the business has an incentive program, and if the user belongs to this incentive program as indicated by the user's digital certificate, the user may receive additional discounts on network access, or may receive "points" in the particular incentive program. As one example, the digital certificate of a user may contain information indicating the user is a member of the American Airlines Advantage program. If this user accesses the service provider's network through an access point located near an American Airlines gate or in an American Airlines Admiral's Club, American Airlines may choose to allow the user free or reduced rate access while connected to the network. The airline may also use this information to send advertisements or incentive information to the subscriber, as well as update "points" or "miles" in the user's AA Advantage account.

In another example, the purchaser of a new laptop computer may have received a given amount of pre-paid network access service with the purchase. A digital certificate stored on the computer may allow the purchaser of the computer to access the service provider network, and a corresponding value bucket filled with a predetermined amount of service for the computer may be stored in a database maintained by the network provider.

In step 236, the method allows the personal computing device of the user access to the network.

Once the user gains access to the network, various service providers may also provide services or information based on the above information, e.g., based on one or more of sponsorship information, demographic information, charging information, or known geographic location information. Examples include targeted advertising and promotions for goods or services, etc.

Figure 5:
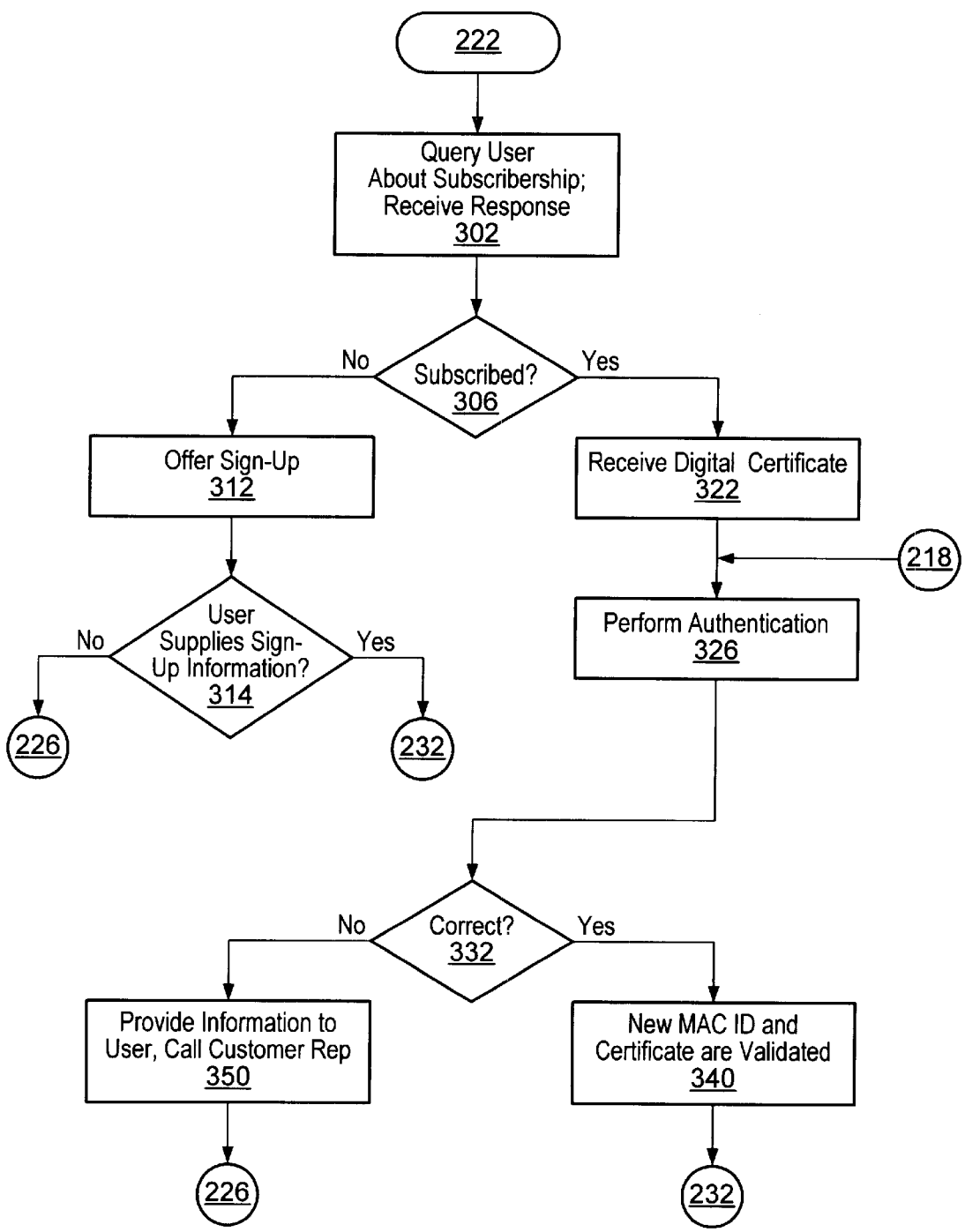
FIG. 5 is a flowchart diagram illustrating operation of step 222 of FIG. 4, which involves the processing performed when an ID or an incorrect certificate is received by the network provider.

FIG. 5—Step 222 of FIG. 4

FIG. 5 is a flowchart diagram illustrating an operation of step 222 of FIG. 4, which involves the processing performed when an invalid MAC user ID and/or an incorrect digital certificate is received by the network provider.

As shown, in step 302 the network provider queries the user about subscribership. In other words, the network provider queries the user as to whether the user is actually subscribed to the network, e.g., is actually a member of the network. For example, the user may have previously subscribed to the network, but may have purchased a new network interface device (e.g., a new wireless or wired Ethernet card) that includes a new MAC ID which is unknown to the network validation system. In this case, the user may actually be subscribed to the network and may have a correct digital certificate on his personal computing device (PCD), but the MAC ID of the network interface device may be incorrect. Thus, in step 302, the method queries the user about whether he/she is actually subscribed to the network. In step 302 the network provider receives a response from the user.

If the user responds that he/she is not actually subscribed to the network as determined in step 306, then in step 312 the method offers the user the option to sign-up for network access. In step 314 the user may optionally supply sign-up information to subscribe to the network. Although not shown in the flowchart of FIG. 5, the user may also of course choose to decline signing-up for network access, in which case network access is disallowed.

If the user replies that he/she is subscribed to the network as determined in step 306, then in step 322 the method receives the digital certificate from the user's PCD. For example, in step 322 the network provider queries the web browser on the user's personal computing device for a digital certificate, and the client browser of the user's personal computing device sends or transfers the certificate to the network provider. In one embodiment, the digital certificate may contain subscription information indicating the identity of the user and whether the user is subscribed to the network.

In step 326 the method performs authentication on the user. In one embodiment, the method asks an authentication question of the user and receives a reply from the user. This authentication may be a pre-configured or pre-determined previously agreed upon by the user, where only the user is presumed to know the answer to the authentication question.

It is noted that step 326 may also be performed in response to the user providing an incorrect digital certificate, or non-receipt of a digital certificate, as determined in step 218 of FIG. 4. This may occur, for example, where the user has bought a new portable computing device (PCD) and thus the digital certificate contained in the web browser of the new personal computer device (PCD) does not include correct identification or subscription information contained within the certificate, or the web browser lacks a digital certificate.

If the authentication is determined to be correct in step 332, then a new MAC ID or new certificate is validated in step 340. Thus, here it is presumed that the user is a valid subscriber. For example, it may be presumed that the user has purchased either a new network interface device which includes a new MAC ID or has purchased a new personal computing device which includes a digital certificate that does not contain the appropriate subscription information, or both. In either case, if the user is able to properly reply to the authentication question in step 326, then the system presumes that the new MAC ID or new certificate is actually a valid ID or certificate, respectively, and these are validated in step 340.

If the authentication is accepted or validated as determined in step 332, then network access is currently disallowed, and the network provider provides an information or display to the user's personal computing device asking the user to call a customer service representative in step 350.

Multiple Communication Service Networks from Different Providers

The system may include multiple communication service networks from different providers. For example, one communication service may be referred to as a WAYPORT network (WAYPORT is a Registered Trademark of Wayport, Inc. of Austin, Tex.). A WAYPORT network may be compatible with other types of similar networks maintained by other companies. For example, if WAYPORT networks are installed in the Austin-Bergstrom International airport and similar 'XYZ' networks are installed in a hotel in downtown Austin, a MU that has subscribed to WAYPORT networks may be able to use the services offered at the downtown hotel by XYZ. More specifically, a MU that has registered with a WAYPORT network (e.g., has entered demographic data and agreed to pay transaction costs) may not need to register with XYZ. The MU may use other network providers (e.g., XYZ networks) and still only be billed from one company (e.g., the provider of the WAYPORT network with which the MU is registered). This may be accomplished through agreements established between different network providers.

For example, a WAYPORT network-registered MU connects to a XYZ network in the downtown hotel. The XYZ network notices from the PCD ID information that the MU is not registered on the XYZ network, but is registered on the WAYPORT network. The XYZ network may perform a verification of the PCD ID by querying a database of registered PCD IDs on the WAYPORT network. The XYZ network may acquire demographic information on the credentials of the MU. If the credentials of a MU are not acceptable, access to the XYZ network may be denied. If the credentials are acceptable, the XYZ network may grant the MU access to various goods, information and/or service providers. The XYZ network may inform the MU (via a message on the MU's PCD) that there is an additional cost for accessing the XYZ network as a non-registered user. The MU may then have the choice of paying the additional fees for the services or disconnecting. In addition, the MU may have the option of registering with the XYZ network to avoid paying 'roaming' fees.

Network Entertainment Service

In one embodiment of the present invention, the network may be utilized to provide game or other entertainment services for users. As described above, the network may be comprised in various facilities such as airports, mass transit stations, etc. which typically have a number of users waiting for a certain period of time, such as for their flight departure, a train departure, etc. As described above, in one embodiment the network may include a plurality of access points comprised in a respective facility, such as an airport or mass transit station, and may include an entertainment server which provides entertainment services. Possible entertainment services include video on demand, movies, television, games, etc.

As one example, the network may include a game server which provides one or more interactive games, such as single player games, multi-player games or role based games. Users may subscribe to the network in order to play a game, or participate in a multi-player game or role playing game. In one embodiment, users may participate anonymously. Alternatively, the user may provide identification information which may be used to reference a database containing a user's configuration or parameter settings for a particular game, such as information with respect to their "characters" in a role playing game or information that may be relevant to a single player or multi-player game. This reference information may be comprised in the digital certificate of the user's PCD, as desired.

Thus, when users are waiting for possibly a lengthy period of time in an airport or mass transit station the user may subscribe to network access in the facility and receive entertainment services. The users may play one or more games or receive various other entertainment such as commercial television, video on demand, digital books, web access or other entertainment services.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A network system, comprising:
   a portable computing device operated by a mobile user, wherein the portable computing device includes at least one digital certificate, wherein the digital certificate comprises sponsorship information;
   a network;
   a plurality of access points coupled to said network, wherein each of the plurality of access points is configured to communicate with the portable computing device;
   at least one service provider coupled to the network, wherein the service provider is operable to receive the digital certificate from the portable computing device, wherein at least one service provider is operable to provide a service to the mobile user;
   wherein access charges for access to the network are computed based on the sponsorship information comprised in the digital certificate.

2. The network system of claim 1, further comprising:
   a database server coupled to the network which stores access charge information of the mobile user, wherein the access charge information indicates the access charges for access to the network;
   wherein the database server is operable to compute the access charge information based on the sponsorship information comprised in the digital certificate.

3. The network system of claim 1,
   wherein the plurality of access points connected are arranged at known locations in a geographic region, wherein a first access point is operable to provide geographic location information indicating a known geographic location of the portable computing device;
   wherein access charges for access to the network are also computed based on the known geographic location of the portable computing device.

4. The network system of claim 1, wherein the sponsorship information comprises information regarding memberships of the mobile user.

5. The network system of claim 1, wherein the sponsorship information comprises information regarding incentive programs in which the mobile user is a member.

6. The network system of claim 1, wherein the sponsorship information comprises information regarding entities in which the mobile user is affiliated.

7. The network system of claim 1, further comprising:
   a database coupled to the network which stores demographic information of the mobile user;
   wherein access charges for access to the network are also computed based on the demographic information of the mobile user.

8. The network system of claim 7,
   wherein the plurality of access points are arranged at known locations in a geographic region, wherein a first access point is operable to provide geographic location information indicating a known geographic location of the portable computing device;

wherein access charges for access to the network are also computed based on the known geographic location of the portable computing device.

9. The network system of claim 1, further comprising:

a database coupled to the network which stores charging information of the mobile user;

wherein access charges for access to the network are also computed based on the charging information of the mobile user.

10. The network system of claim 9, wherein the plurality of access points are arranged at known locations in a geographic region, wherein a first access point is operable to provide geographic location information indicating a known geographic location of the portable computing device;

wherein access charges for access to the network are also computed based on the known geographic location of the portable computing device.

11. The network system of claim 1, further comprising:

a database coupled to the network which stores demographic information and charging information of the mobile user;

wherein access charges for access to the network are also computed based on the demographic information and the charging information of the mobile user.

12. The network system of claim 11, wherein the plurality of access points are arranged at known locations in a geographic region, wherein a first access point is operable to provide geographic location information indicating a known geographic location of the portable computing device;

wherein access charges for access to the network are also computed based on the known geographic location of the portable computing device.

13. The network system of claim 1, wherein the digital certificate comprises demographic information of the mobile user;

wherein access time charges for access to the network are also computed based on the demographic information of the mobile user.

14. The network system of claim 1, wherein the digital certificate comprises charging information of the mobile user;

wherein access time charges for access to the network are also computed based on the charging information of the mobile user.

15. The network system of claim 1, wherein the at least one service provider is operable to provide the service to the mobile user based on the sponsorship information comprised in the digital certificate.

16. The network system of claim 15, wherein the plurality of access points are arranged at known locations in a geographic region, wherein a first access point is operable to provide geographic location information indicating a known geographic location of the portable computing device;

wherein the at least one service provider is also operable to provide the service to the mobile user based on the known geographic location of the portable computing device.

17. The network system of claim 15, wherein the at least one service provider is also operable to provide the service to the mobile user based on one or more of demographic information or charging information of the mobile user.

18. The network system of claim 15, wherein the at least one service provider is operable to provide information to the mobile user based on the sponsorship information comprised in the digital certificate.

19. The network system of claim 1, wherein the access charges comprise an amount of available network access usage.

20. The network system of claim 1, wherein the signal is a wireless signal.

21. The network system of claim 1, wherein the digital certificate further stores use identification information identifying the mobile user.

22. A portable computing device operated by a mobile user in a network, comprising;

a processing unit;

a memory medium coupled to the processing unit including at least one digital certificate, wherein the digital certificate comprises sponsorship information;

a communication device for communicating with the network, wherein the communication device is configured to transmit the digital certificate;

wherein the portable computing device is operable to provide the digital certificate to at least one service provider on the network;

wherein access charges for access to the network by the portable computing device are computed based on the sponsorship information comprised in the digital certificate.

23. A network system, comprising:

a plurality of access points operable to be coupled to a network, wherein each of the plurality of access points is configured to communicate with a portable computing device operated by a mobile user;

at least one service provider coupled to the network, wherein the at least one service provider is operable to receive a digital certificate from the portable computing device, wherein the digital certificate comprises sponsorship information of the mobile user, wherein the at least one service provider is operable to provide a service to the mobile user;

wherein access charges for access to the network are computed based on the sponsorship information comprised in the digital certificate.

24. A network system, comprising:

a plurality of access points operable to be coupled to a network, wherein each of the plurality of access points is configured to communicate with a portable computing device operated by a mobile user;

wherein a first access point of the plurality of access points is operable to receive a digital certificate from the portable computing device, wherein the digital certificate comprises sponsorship information of the mobile user;

wherein access charges for access to the network are computed based on the sponsorship information comprised in the digital certificate.

25. The network system of claim 24, further comprising:

at least one service provider connected to the network, wherein the at least one service provider is operable to receive the digital certificate from the portable computing device, wherein the at least one service provider is operable to provide a service to the mobile user.

26. A network system, comprising:

a portable computing device operated by a mobile user, wherein the portable computing device includes a digital certificate, wherein the digital certificate comprises sponsorship information;

a network;

a plurality of access points coupled to said network, wherein each of the plurality of access points is configured to communicate with the portable computing device;

at least one service provider connected to the network, wherein the at least one service provider is operable to receive the digital certificate from the portable computing device, wherein the at least one service provider is operable to provide a service to the mobile user based on the sponsorship information comprised in the digital certificate.

27. The network system of claim 26, wherein the plurality of access points are arranged at known locations in a geographic region, wherein a first access point is operable to provide geographic location information indicating a known geographic location of the portable computing device;

wherein access charges for access to the network are also computed based on the known geographic location of the portable computing device.

28. The network system of claim 26, wherein the sponsorship information comprises information regarding memberships of the mobile user.

29. The network system of claim 26, wherein the sponsorship information comprises information regarding incentive programs in which the mobile user is a member.

30. The network system of claim 26, wherein the sponsorship information comprises information regarding entities in which the mobile user is affiliated.

31. The network system of claim 26, further comprising:

a database coupled to the network which stores demographic information of the mobile user;

wherein the at least one service provider is also operable to provide the service to the mobile user based on the demographic information of the mobile user.

32. The network system of claim 26, further comprising:

a database coupled to the network which stores charging information of the mobile user;

wherein the at least one service provider is also operable to provide the service to the mobile user based on the charging information of the mobile user.

* * * * *

UNITED STATES PATENT AND TRADEMARK OFFICE
CERTIFICATE OF CORRECTION

PATENT NO. : 6,571,221 B1
DATED : May 27, 2003
INVENTOR(S) : Stewart et al.

It is certified that error appears in the above-identified patent and that said Letters Patent is hereby corrected as shown below:

Column 18,
Line 41, please delete the word "connected" after "access points".

Signed and Sealed this

Twenty-second Day of July, 2003

JAMES E. ROGAN
*Director of the United States Patent and Trademark Office*